United States Patent [19]

Chanel

[11] Patent Number: 4,765,463
[45] Date of Patent: Aug. 23, 1988

[54] DISPLAY-TRAY CONSTITUTING A PACKAGE

[75] Inventor: Arthur L. Chanel, Saint-Remy, France

[73] Assignee: Fromageries Bresse-Bleu-Societe Laitiere Cooperative Agricole, France

[21] Appl. No.: 68,888

[22] Filed: Jun. 29, 1987

[30] Foreign Application Priority Data

Jul. 9, 1986 [FR] France ................................. 86 10026

[51] Int. Cl.$^4$ .......................... B65D 25/00; B65D 1/36
[52] U.S. Cl. ............................. 206/45.34; 206/484.2; 206/557; 206/524.2; 206/564; 206/524.8
[58] Field of Search ............... 206/45.34, 524.2, 524.3, 206/524.8, 557, 564, 484, 484.2

[56] References Cited

U.S. PATENT DOCUMENTS

| Re. 30,098 | 9/1979 | Titchenal et al. | 206/484 |
| 3,792,181 | 2/1974 | Mahaffy et al. | 206/484 X |
| 4,211,326 | 7/1980 | Hein et al. | 206/484 |
| 4,407,874 | 10/1983 | Gehrke | 206/484.2 |

*Primary Examiner*—William Price
*Attorney, Agent, or Firm*—McGlew and Tuttle

[57] ABSTRACT

The bottom (1) and the cover (2) are made from a rigid composite material constituted by a sheet of PVC coated with a layer of polyethylene on which is applied a film of polyethylene of peelable quality. The bottom (1) has cavities (4). Peripheral flanges (3, 3') includes ears (6, 6') and are welded along a strip (7) having weakened regions (8). The cover is peelable.

16 Claims, 1 Drawing Sheet

DISPLAY-TRAY CONSTITUTING A PACKAGE

The present invention relates to a display tray constituting a package.

Many packages of plastics material are already known which comprise a rigid receptacle, with or without cavities housing the product or products and closed by a peelable sheet, i.e. a sheet capable of being gradually unstuck by a pull exerted upon a part of its periphery.

In packages of this type, the receptacle is of polyvinyl chloride (PVC) and the sheet closing it is of polyethylene and its welding to the PVC allows it to be pulled away from the receptacle; on the other hand, this sheet is flexible.

As this material has no rigidity, these packages imperfectly protect the products they contain, and it was not possible up to the present time to produce a package having a rigid bottom and rigid cover of PVC which effectively protects the packed articles or products against contacts, shocks or pressures and whose cover is capable of being detached from the bottom by a progressive unsticking thereof, i.e. a cover which is said to be "peelable", because welds between an element of PVC and another element of PVC do not allow these elements to be separated from each other.

An object of the invention is to overcome this deficiency by providing such a package which is entirely rigid and has a peelable rigid cover.

The invention therefore provides a package of the type comprising a rigid bottom of PVC closed in its upper part by a "peelable" wall, wherein the cover is also of rigid polyvinyl chloride, at least one of two elements consisting of the bottom and the cover having on its surface a thin layer of polyethylene of "peelable" quality, the rigidity of said bottom being greater than the rigidity of said cover, the latter being fixed to said bottom by a peripheral strip of welding having at least one weakened region.

The bottom and the cover are preferably made from a sheet of PVC covered, after having been formed, with a coating of polyethylene on which is applied a film of polyethylene of peelable quality.

The invention also provides a display-tray forming a rigid package comprising a rigid bottom and a rigid cover of PVC at least one of which has on its internal surface a thin layer of polyethylene of peelable quality, said bottom having cavities and a rigidity greater than that of said cover, the latter being fixed to said bottom by a peripheral strip of welding having at least one weakened region.

Although the display-tray according to the invention may be used for all kinds of manufactured products, it will be described hereinafter, by way of example, in its application to food products and more particularly for small cheeses of the type termed "bouchées."

According to another feature of the invention, the bottom and the cover each have a flat outer peripheral flange including two opposite outwardly extending ears which have identical shapes and dimensions, said flanges, which are superimposed, being welded together by a peripheral welding line, in which said weakened regions are closely adjacent to the base of said ears.

The following description, with reference to the accompanying drawings, given by way of a non-limiting example, will explain how the invention can be carried out.

Figure 1:
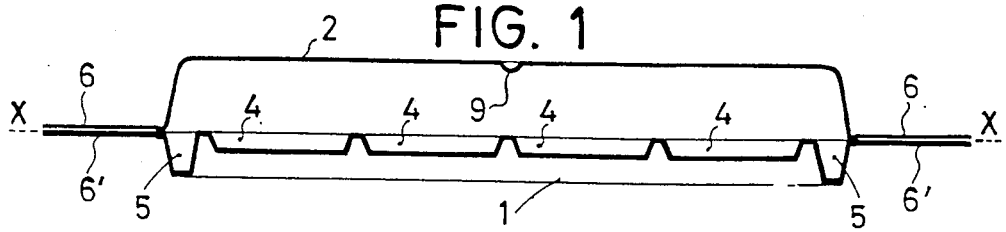
FIG. 1 is a diagrammatic longitudinal sectional view, partly in side elevation, of a display-tray according to the invention.

With reference to the drawing, the display-tray according to the invention comprises a bottom 1 and a cover 2, each having an flat peripheral flange 3, 3' outwardly extending in a plane parallel to the longitudinal median plane X—X of the assembly.

In the represented embodiment, the bottom 1 is of a composite material comprising a sheet 10 of polyvinyl chloride (PVC) which is of food quality (suitable for food), opaque, coloured or otherwise, hot formed in accordance with a known process so as to present cavities 4 for receiving, for example, small cheeses ("bouchées"), and thereafter covered with a coating of a thinner layer 11 of polyethylene of food quality on which is finally applied by complexing under pressure a thin film 12 of polyethylene of peelable quality.

The bottom advantageously has a peripheral trough 5 of U- or like section advantageously formed by the same process as the cavities 4 and at the same time as the latter.

As shown in the drawing, the trough 5 is immediately adjacent to the peripheral flange 3' of the bottom and on the inner side of said flange.

The cover 2 is hollow and dish-shaped. It is made from the same composite material as the bottom 1 but is transparent. It's opening is defined by the flange 3 the shape and dimensions of which are identical to those of the flange 3' of the bottom 1.

The flanges 3 and 3' have two opposite ears 6, 6' outwardly extending in the plane of the flanges 3 and 3' respectively.

In the represented embodiment, the ears 6, 6' have a rounded shape, but they may have an elongated, rectangular or some other shape.

Likewise, as concerns the cavities 4, it will be understood that their shape and number may be different from the represented embodiment.

Figure 3:
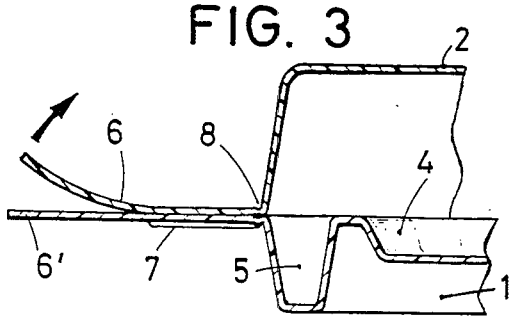
FIG. 3 is a partial diagrammatic sectional view taken on line III—III of FIG. 2.
Figure 4:
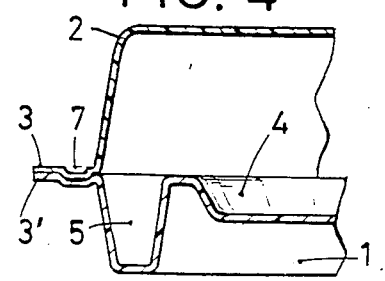
FIG. 4 is a partial diagrammatic sectional view taken on line IV—IV of FIG. 2.
Figure 5:
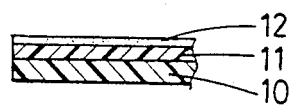
FIG. 5 is a partial view to a very large scale showing the superimposition of the various layers of materials of the bottom and/or the cover.

The flanges 3, 3' are bonded or welded together, preferably by high-frequency or some other appropriate non-thermal process, along a continuous strip 7 on the flanges of constant width throughout the periphery of the package except in the region of the ears 6, 6' where this weld interconnecting the peelable polyethylene films has a weakened part formed by a portion 8 of notably reduced width, leaving a notable portion of the ears 6, 6' non-interconnected by welding enabling the ears to be spread apart and taken hold of, as shown in FIG. 3, for the purpose of exerting thereon a pull in opposite directions in the weakened region 8 of the weld 7, in this way, it is easy to open the display-tray by a progressive unsticking of the cover.

Advantageously, the cover 2 has at least one inwardly extending projection such as shown at 9, in the shape of a pyramid or cone, for the purpose of gathering possible condensation on the inner surface of the cover.

As it is devoid of means similar to the trough 5 of the bottom, the cover is less rigid than the latter and this facilitates the unsticking when opening the display-tray. Moreover, its thickness is less than that of the bottom, the ratio between the cover and bottom thicknesses being advantageously about 7:10, for 7 um for the cover and 500 um for the bottom.

The rigidity of the display-tray according to the invention permits the packaging of fragile products such as cheeses and their stacking with no risk of deterioration.

The display-tray constructed in this way is rigid and fluid-tight. Consequently, it is preferably filled with an inert gas at the moment of welding, which ensures a prolonged preservation of the products contained therein.

Figure 2:
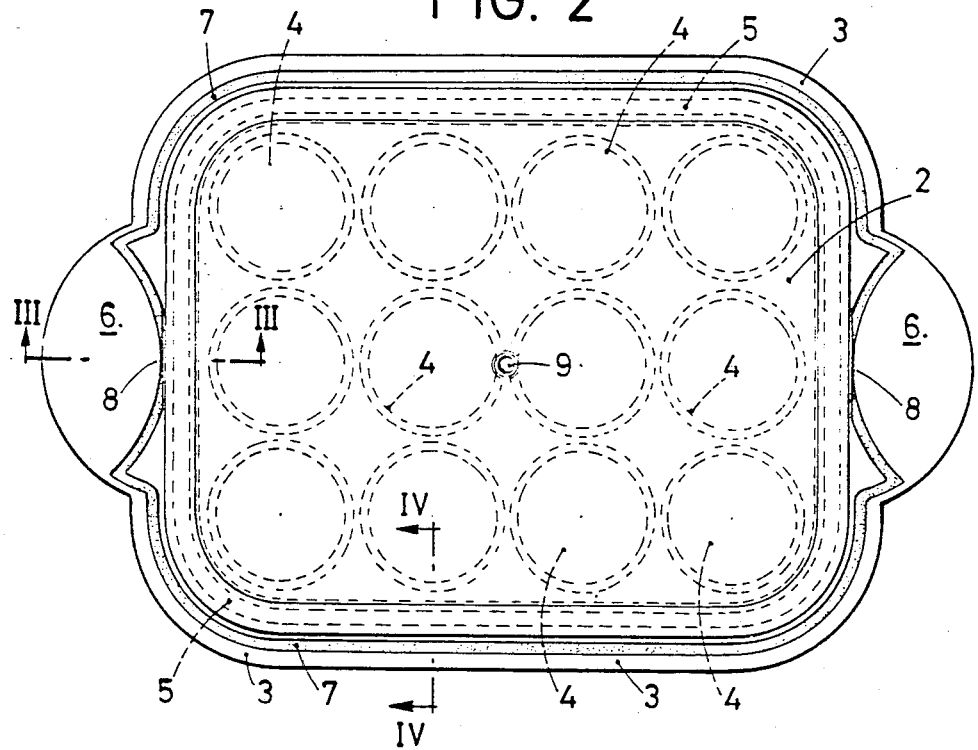
FIG. 2 is a top plan view thereof.

It will of course be understood that the scope of the invention is not limited to the shape shown in plan by way of example in FIG. 2, since this shape may be circular, oval or some other shape. Further, decorative patterns or advertising may be added to the tray.

What is claimed is:

1. A package comprising a rigid bottom of PVC, a "peelable" wall constituting a cover for closing an upper part of said bottom, said cover also being of rigid polyvinyl chloride, at least one of two elements consisting of said bottom and said cover having on a surface thereof inside said package a thin layer of polyethylene of "peelable" quality, the rigidity of said bottom being greater than the rigidity of said cover, and a strip of welding located adjacent to the periphery of said bottom for fixing said cover to said bottom and having at least one weakened region.

2. A rigid display-tray structure comprising a rigid bottom and a rigid cover both of PVC, at least one of two elements consisting of said bottom and said cover having on an internal surface thereof a thin layer of polyethylene of "peelable" quality, said bottom having cavities and a rigidity greater than the rigidity of said cover, and a strip of welding located adjacent to the periphery of said bottom for fixing said cover to said bottom and having at least one weakened region.

3. A display-tray structure constituting a package comprising a rigid bot-tom of PVC, a "peelable" wall constituting a cover for closing an upper part of said bottom, said cover also being of rigid polyvinyl chloride, at least one of two elements consisting of said bottom and said cover having on a surface thereof inside said package a thin layer of polyethylene of "peelable" quality, the rigidity of said bottom being greater than the rigidity of said cover, and a strip of welding located adjacent to the periphery of said bottom for fixing said cover to said bottom and having at least one weakened region, said bottom and said cover being formed from a sheet of PVC coated, after said sheet has been formed, with a layer of polyethylene on which a film of polyethylene of "peelable" quality is applied.

4. A display-tray structure according to claim 3, wherein said bottom and said cover each include a substantially flat outer peripheral flange, each flange having two opposed projecting ears of identical shape and dimensions, said bottom further comprising a trough adjacent to and on an inner side of said flange.

5. A display-tray structure according to claim 4, wherein said trough has a U-shaped cross-section.

6. A display-tray structure according to claim 4, wherein said peripheral flange of said bottom extends in a plane parallel to a general plane of said display-tray.

7. A display-tray structure according to claim 3, wherein said weakened region of said strip of welding is formed by a narrowed portion of said strip.

8. A display-tray structure constituting a package comprising a rigid bottom and a rigid cover both of PVC, at least one of two elements consisting of said bottom and said cover having on an internal surface thereof a thin layer of polyethylene of "peelable" quality, said bottom having cavities and a rigidity greater than the rigidity of said cover, and a strip of welding located adjacent to the periphery of said bottom for fixing said cover to said bottom and having at least one weakened region, said bottom and said cover being formed from a sheet of PVC coated, after said sheet has been formed, with a layer of polyethylene on which a film of polyethylene of "peelable" quality is applied.

9. A display-tray structure according to claim 8, wherein said bottom and said cover each include a substantially flat outer peripheral flange, each flange having two opposed projecting ears of identical shape and dimensions, said bottom further comprising a trough adjacent to and on an inner side of said flange.

10. A display-tray structure according to claim 9, wherein said trough has a U-shaped cross-section.

11. A display-tray structure according to claim 9, wherein said peripheral flange of said bottom extends in a plane parallel to a general plane of said display-tray.

12. A display-tray structure according to claim 8, wherein said weakened region of said strip of welding is formed by a narrowed portion of said strip.

13. A display-tray structure constituting a package according to claim 1, wherein said bottom is opaque and said cover is hollow and of a transparent material.

14. A display-tray structure constituting a package according to claim 1, wherein said bottom is coloured and said cover is hollow and of a transparent material.

15. A display-tray structure constituting a package according to claim 1, filled with an inert gas.

16. A display-tray structure constituting a package according to claim 1, wherein said cover comprises at least one downwardly tapering internal projection.

* * * * *